Figures 1, 2, 3, 4:
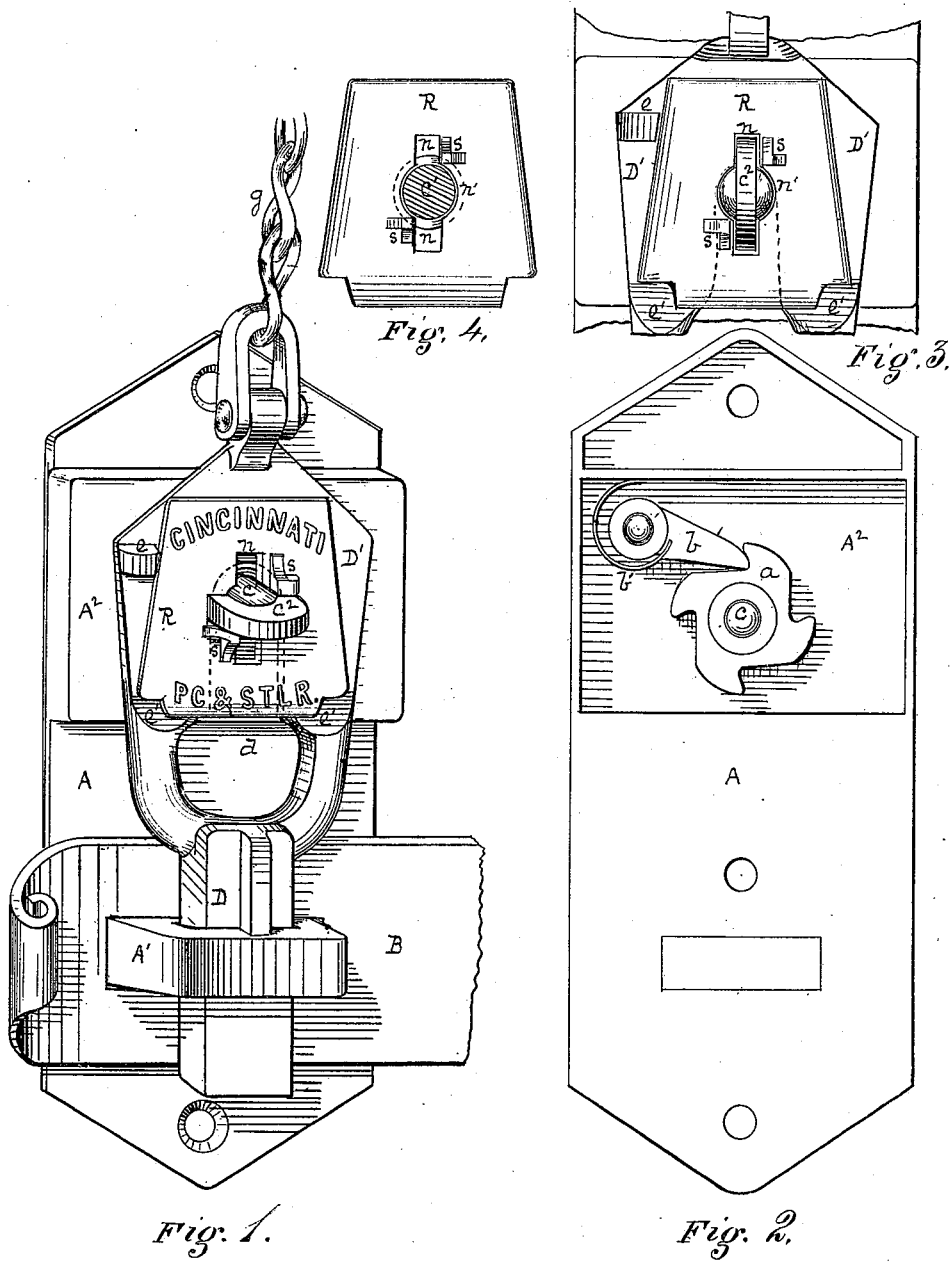

(Model.)

J. KINZER.
Seal Lock.

No. 230,023.                    Patented July 13, 1880.

Witnesses.
R. H. Whittlesey
Harvey Blake

Inventor Jacob Kinzer,
By Attorney George H. Christy

UNITED STATES PATENT OFFICE.

JACOB KINZER, OF PITTSBURG, PENNSYLVANIA.

SEAL-LOCK.

SPECIFICATION forming part of Letters Patent No. 230,023, dated July 13, 1880.

Application filed May 10, 1880. (Model.)

*To all whom it may concern:*

Be it known that I, JACOB KINZER, of Pittsburg, county of Allegheny, State of Pennsylvania, have invented or discovered a new and useful Improvement in Seal-Locks, (Case B;) and I do hereby declare the following to be a full, clear, concise, and exact description thereof, reference being had to the accompanying drawings, making a part of this specification, in which—like letters indicating like parts—

Figure 1 is a front elevation, slightly in perspective, of my improved seal-lock. Fig. 2 is a reverse or back view of the same. Fig. 3 is a front view of the upper part of Fig. 1, but with the devices in proper position for the placing of the seal in position; and Fig. 4 is a detached front view of the seal and of a section of the rotating stem in the plane of the seal.

My present invention relates to the class of locks most commonly employed in securing the doors of railway-cars, and adapted to other kindred uses, in which a frangible seal is combined with a rotating stem having a T or L shaped head and a ratchet and pawl in such manner and under such conditions that the projecting part of the head may, for the purpose of holding the seal in place, be rotated against a fixed stop or stops thereon, so as to prevent farther forward rotation, while the ratchet and pawl, inaccessible from outside, will prevent back rotation. Also, the seal is so combined with the hasp bolt or pin as to prevent the latter from being withdrawn while the seal is in place. Hence unlocking can be effected only by breaking the frangible seal, and in locking, a key to throw a locking-bolt is not required, since the locking is effected by the rotation of the stem.

In the drawings, A represents the lock case or frame, made of suitable size and proportions. The end of an ordinary hasp is shown at B.

At A' I have shown a staple, and at D a bolt or pin for securing the hasp. This bolt has an enlarged or flattened head, D', in which I make an eye, $d$, which is of any desired shape with reference to giving to the bolt the motions desired, as presently to be explained.

In the back of the case is a recess or box, A², in which I arrange a ratchet-wheel, $a$, on the rotating stem $c$, and a pawl, $b$, which is held down in contact with the ratchet-wheel by any suitable spring, $b'$, the one shown being secured to the case and pawl so as to hold the latter down.

The stem $c$ projects through the case, and in the plane of the seal R has a cylindrical form, as at $c'$. On its outer end is a head or thumb-piece, made by preference in the form of a T, as at $c^2$, though an L-shaped projection to one side may answer the purpose. The flattened face of the bolt-head D' furnishes a seat for a frangible seal, R, and suitable means are provided for preventing the seal R from rotating on its seat—as, for example, a shoulder or stop, $e$, or sloping faces $e'$, or an equivalent square shoulder at the same point, or both or more of the same kind, as may be desired. The seal has a slot, $n$, made therein, but with a central enlargement, $n'$, corresponding in size and shape to the cylindrical shank $c'$ of the rotating stem. Then, with the T-head $c^2$ rotated to the position shown in Fig. 3, the seal R is slipped on over it. It will be observed, then, that the covered edges of the central enlargement, $n'$, take, and as the stem $c$ is rotated preserve, a bearing on the shank $c'$, and also that the sloping faces or shoulders at $e'$ bear on the end of the seal, so that after the seal is in place the bolt or pin D cannot be withdrawn. As soon as the seal is on its seat the T-head $c^2$ is turned one-quarter of a revolution, more or less, or far enough to stand crosswise of the slot $n$, so that the seal cannot be slipped off over the T-head, and at such point the projecting ends of the T-head, or the arm of the L if such be used, engage a fixed stop or stops, $s$, made on the seal. The ratchet-teeth are so spaced that the pawl and a tooth will then be in engagement. Consequently the T-head cannot be turned farther forward, since the stops $s$ prevent motion in that direction, and the ratchet and pawl prevent its being turned back. Hence the bolt cannot be removed so as to free the hasp except by first breaking the seal R, or, if the T-head be knocked off, the seal R will be loosened so as to drop off, of its own accord. Consequently in any case the absence of the seal will show at once that the lock has been tampered with and lead to the proper investigation; and that the seal may be more conspicuous I prefer to make it of some white or light-colored metal, the lock itself being dark, or vice versa.

The eye $d$ should be of such form that when the bolt is in place the walls of the eye will engage the cylindrical shank $c'$, or be near enough thereto to keep the stop $e$ (or such other stop or stops thereon as may be employed) in proper engagement with the seal R with reference to preventing the rotation of the latter on its seat. Such shape is indicated by dotted lines in Fig. 1. Below this the eye may be enlarged so that the bolt may be taken entirely off the T-head $c^2$, even when the latter stands crosswise, and allowed to hang by its chain $g$, or it may be merely lengthened, so as to have the necessary range of motion for insertion in and removal from the staple.

The place or arrangement and the number and form of the stops both for preventing the rotation of the seal on its seat of the stem in either direction as well as the withdrawal of the bolt after the seal is in place may be varied at pleasure without any substantial departure from the scope of my invention, it only being essential that the devices named shall interlock or engage in the order set forth with reference to the functions described.

Under the term "T-headed stem," as used in the claims hereunto annexed, I expressly include as a part of its meaning the mechanical equivalents thereof, as hereinbefore described, as well as all other mechanical equivalents.

I claim herein as my invention—

1. A frangible seal having a stop or stops thereon, in combination with a rotating T-headed stem and ratchet and pawl, substantially as set forth.

2. The combination of a rotating stem, $c$, having a ratchet-and-pawl device at one end, a T-headed stem at the other, an interposed cylindrical shank, $c'$, a seal having an opening to fit such shank, and engaging when on its seat the hasp bolt or pin, substantially as set forth.

3. The hasp bolt or pin having a stop or stops thereon for engaging the seal, a frangible seal engaging the stem, and provided with a stop or stops for limiting the motion of the stem in one direction, substantially as set forth.

In testimony whereof I have hereunto set my hand.

JACOB KINZER.

Witnesses:
R. H. WHITTLESEY,
GEORGE H. CHRISTY.